United States Patent [19]

Merrigan et al.

[11] Patent Number: 4,969,802
[45] Date of Patent: Nov. 13, 1990

[54] VIBRATORY PUMPING OF A FREE FLUID STREAM

[75] Inventors: Michael A. Merrigan, Santa Cruz; Keith A. Woloshun, Los Alamos, both of N. Mex.

[73] Assignee: United States Department of Energy, Washington, D.C.

[21] Appl. No.: 457,461

[22] Filed: Dec. 27, 1989

[51] Int. Cl.[5] .................. F28D 15/00; F04B 19/00; B64G 1/50

[52] U.S. Cl. .................. 417/53; 417/572; 165/41; 165/104.31; 165/904; 165/84

[58] Field of Search .............. 417/572, 53; 165/41, 165/104.31, 904, 84

[56] References Cited

U.S. PATENT DOCUMENTS

| | | | |
|---|---|---|---|
| 2,787,444 | 4/1957 | Skarstrom | 165/84 |
| 3,103,179 | 9/1963 | Ivanoff | 417/572 |
| 3,298,314 | 1/1967 | Kopezynski | 417/572 |
| 4,414,961 | 11/1983 | Luebke | 126/432 |
| 4,501,319 | 2/1985 | Edelman et al. | 165/84 |
| 4,514,735 | 4/1985 | Jones . | |
| 4,572,285 | 2/1986 | Botts et al. | 165/104.28 |
| 4,603,731 | 8/1986 | Olsen | 165/41 |
| 4,684,328 | 8/1987 | Murphy | 417/322 |
| 4,706,740 | 11/1987 | Mahefkey | 165/104.14 |
| 4,877,082 | 10/1989 | Collins, Jr. | 165/104.26 |

Primary Examiner—Albert W. Davis, Jr.
Attorney, Agent, or Firm—Milton D. Wyrick; Paul D. Gaetjens; William R. Moser

[57] ABSTRACT

A vibratory fluid pump having a force generator for generating asymmetric periodic waves or oscillations connected to one end of one or more fluid conveyance means, such as filaments. The opposite ends of the filaments are connected to springs. Fluid introduced onto the filaments will traverse along the filaments according to the magnitude of the positive and negative excursions of the periodic waves or oscillations, and can be recovered from the filaments.

18 Claims, 2 Drawing Sheets

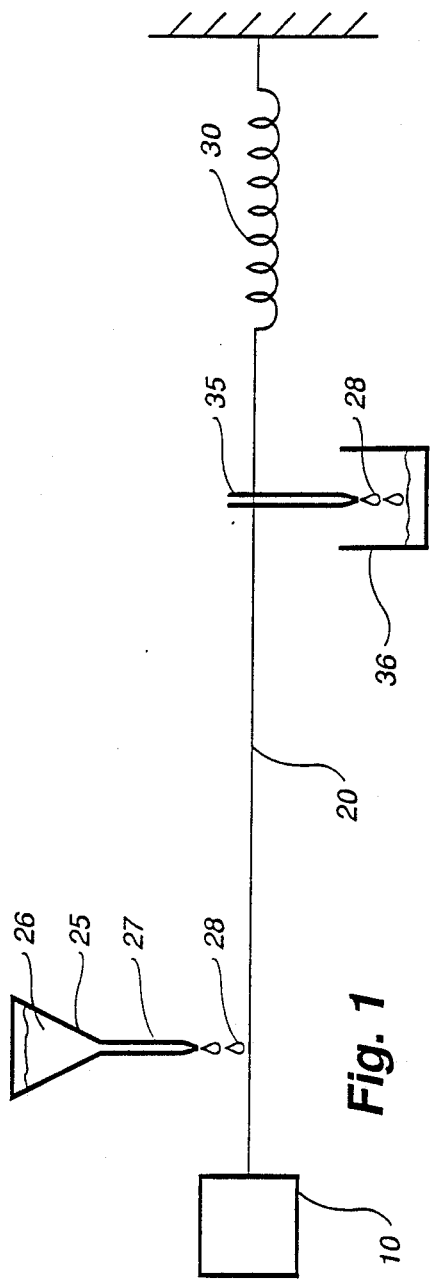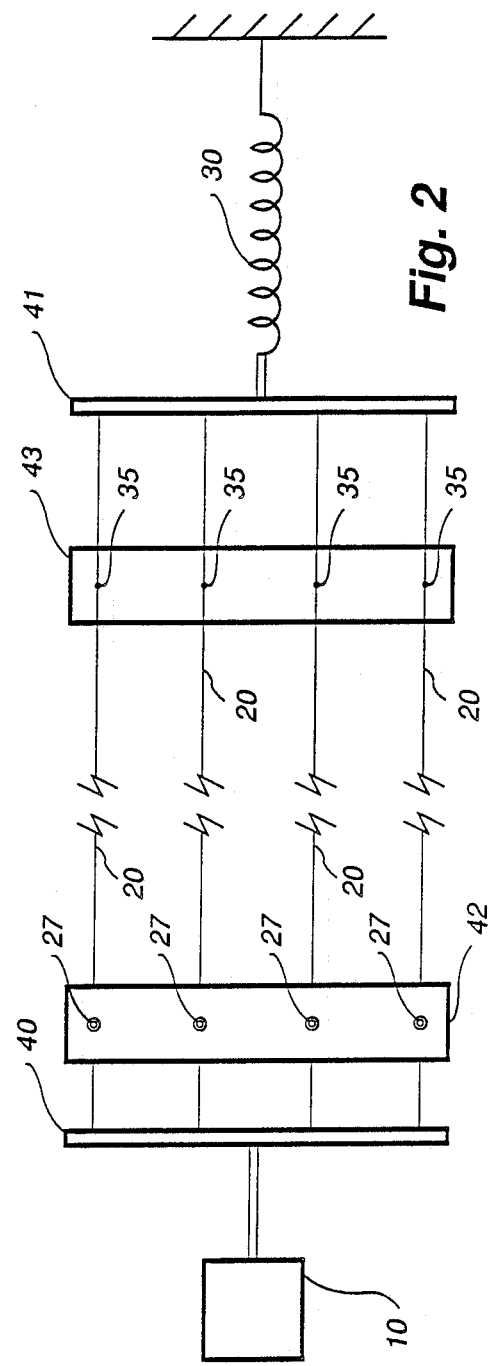

VIBRATORY PUMPING OF A FREE FLUID STREAM

The invention is a result of a contract with the Department of Energy (Contract No. W-7405-ENG-36).

BACKGROUND OF THE INVENTION

The present invention generally relates to the field of heat exchange and, more specifically to the use of periodic oscillations to drive a fluid stream along a cord to expose it to the surrounding atmosphere.

It is important, particularly in space applications, to be able to expel heat into a heat sink, such as the surrounding environment. This is becoming increasingly important as more space activity with larger spacecraft and increasing mission requirements is occurring. Also, in some chemical or biological processes, it is necessary to expose a fluid to a gas. In such applications, it is desirable, and in some cases required, that the heat exchange apparatus not require or be affected by gravitational forces.

Devices for transporting fluids which do not use pumps have been in existence for some time. Many of these devices produce an external fluid flow to exchange heat or mass with the surrounding atmosphere.

One such method is disclosed in U.S. Pat. No. 4,572,285 to Botts et al. which is operable in a space environment. It is in such an environment that efficient heat transfer is becoming more important because of the increasing power loads of current spacecraft. Given the relatively small volume of the spacecraft, it is clear that heat dissipation must occur exterior to the craft into the space environment.

The Botts et al. patent attempts to accomplish this through use of a piezoelectrically driven drop generator to propel a magnetizable liquid across a space to a magnetically focusing collector. Although this system may operate in a gravity free environment, it cannot function on earth. Additionally, the system would not operate properly if the spacecraft were not stationary.

Other heat transfer devices for space applications typically use heat pipes. One such device is disclosed in U.S. Pat. No. 4,706,740 to Mahefkey. Heat pipes are used in conjunction with grooved wall surfaces for absorbing heat from the pipes and radiating it to the environment. Another device, disclosed in U.S. Pat. No. 4,603,731 to Olsen, uses heat pipes having carbon fibers attached to promote heat transfer. Both of these systems involve a large amount of mass added to the spacecraft.

The present invention solves these problems by providing a heat transfer system which is effective in either a space or earthbound setting and whose mass is almost negligible. Additionally, the system will function even with low velocity movement of the system.

It is therefore an object of the present invention to provide heat transfer apparatus which will operate either in space or on earth.

It is a further object of the invention to provide heat transfer apparatus that has a very low mass.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a vibratory fluid pump comprising force generating means for outputting asymmetrical waves or oscillations, with elongate fluid conveyance means having a first end attached to the force generating means for conveying a fluid along its length. Fluid introduction means are in fluid communication with the first end of the elongate wave transmission means for placing a fluid onto the elongate fluid conveyance means. Elastic means are attached to a second end of the elongate fluid conveyance means and to a termination for elastically securing the elongate fluid conveyance means. Fluid recovery means are in fluid communication with the second end of the elongate fluid conveyance means for extracting the liquid from the second end of the elongate fluid conveyance means.

In further aspect of the present invention and in accordance with its objects and purposes, a method of exposing a fluid to a surrounding atmosphere may comprise the steps of generating asymmetric waves or oscillations in an elongate fluid conveyance means for conveying a fluid between its first and second ends; introducing a fluid onto said first end of said elongate fluid conveyance means; and removing said fluid from said second end of said elongate fluid conveyance means.

BRIEF DESCRIPTION OF THE DRAWINGS

The accompanying drawings, which are incorporated into and form a part of the specification, illustrate an embodiment of the present invention and, together with the description, serve to explain the principles of the invention. In the drawings:

FIG. 1 is a schematic view of the simplest embodiment of the present invention.

FIG. 2 is a schematic top view of an embodiment of the invention wherein multiple elongate fluid conveyance means are employed.

DETAILED DESCRIPTION OF THE PREFERRED EMBODIMENTS

Figure 3:
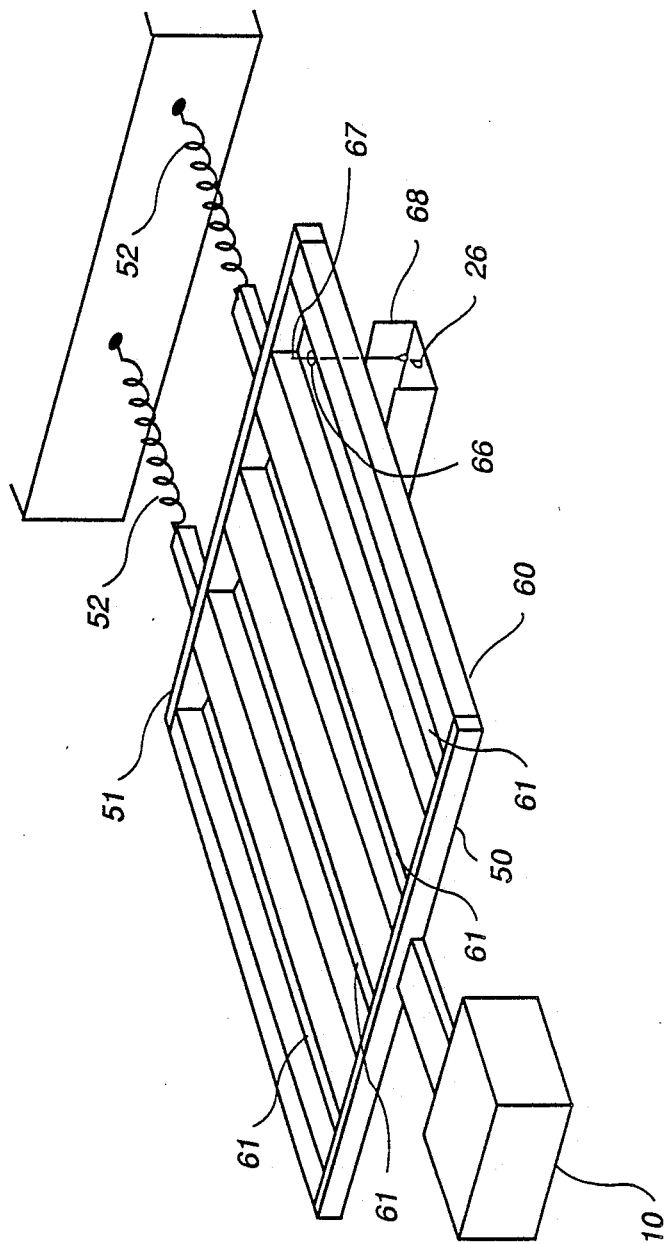
FIG. 3 is a perspective view of an embodiment of the present invention in which a corrugated platform is utilized as the elongate fluid conveyance means.

Referring first to FIG. 1, there can be seen a schematic representation of the simplest embodiment of the present invention. In FIG. 1, asymmetric force generator 10 is connected to fluid conveyance means, which in this embodiment is filament 20. The opposite end of filament 20 is secured to elastic support 30, which in this embodiment is a spring. The opposite end of elastic support 30 is connected to a stationary support. Elastic support 30 permits relatively uniform motion of filament 20 in the plane of its principal dimension, and allows the waves set up in filament 20 to propagate along filament 20. Filament 20 may be either pervious or impervious to fluids.

The force applied to filament 20 by force generator 10 is tailored into an asymmetric waveshape that results in net motion of a fluid either toward or away from elastic support 30. This net motion is produced by the displacement and rate dependence of the viscous and surface forces produced that tend to hold an individual droplet of the fluid on the surface of filament 20. Force generator 10 is adjusted to provide a wave or oscillation having a short duration force in the desired direction of sufficient magnitude to overcome resisting forces and induce droplet motion, while the force in the opposite direction is of insufficient magnitude to overcome resisting forces.

At the end of filament 20 near force generator 10. fluid reservoir 25 contains fluid 26 which is to be treated by transit across filament 20. Fluid 26 is introduced onto filament 20 through dispenser 27 as droplets 28. However, fluid 26 can be introduced in any convenient fashion that is suitable for the application. For example, filament 20 may simply be placed into contact with a reservoir (not shown) containing fluid 26.

The asymmetric waves produced by force generator 10, if primarily positive, cause droplets 28 to migrate along filament 20 toward the end connected to elastic support 30.

At the opposite end of filament 20, near elastic support 30. fluid retriever 35 extracts droplets 28 from filament 20 and transports droplets 28 into reservoir 36. Alternatively, if filament 20 is a wire, the wire could loop through an eyelet on elastic support 30 and droplets 28 could drop directly into reservoir 36.

In low or no gravity applications, fluid 26 can be retrieved by means of a porous structure having a mean pore size smaller than the surface curvature of the film created by fluid 26 on filament 20.

A more practical embodiment of the present invention is illustrated in FIG. 2. Here, multiple filaments 20 are attached to common driver 40, which is in turn attached to asymmetric force generator 10. At the opposite end, multiple filaments 20 are connected to common connection 41, which is itself attached to elastic support 30, here a spring. Again, elastic support 30 is connected to a stationary support. It will be appreciated that there is no requirement that multiple filaments 20 be arranged in a single plane as shown in FIG. 2. Multiple filaments 20 may be arranged in many spatial configurations.

In this embodiment, fluid 26 can be introduced onto and removed from filaments 20 as accomplished in the previous embodiment. However, one other method which would be more practical is illustrated. Here, trough 42 distributes fluid 26 to individual dispensers 27 overlying each filament 20. Similarly, individual retrievers 35 at the ends of each filament 20 extract droplets 28 and deposit them into recovery trough 43. As before, the fluid is transported along filaments 20 by asymmetric wave action produced by force generator 10.

Filaments 20 can be either pervious or impervious to fluids. For this reason, any number of materials would be acceptable. One material which has operated successfully is single or multiple strand stainless steel. Motion of the fluid along filaments 20 can be enhanced by surface treatment or texturing of filaments 20.

An embodiment which departs from the use of filaments 20 is illustrated in FIG. 3. Here, the output of force generator 10 is connected to a common driver 50 which is securely attached to corrugated platform 60. The opposite end of corrugated platform 60 is connected through end piece 51 to elastic supports 52. Corrugated platform 60 could be constructed of numerous materials. Examples of such materials are titanium, aluminum, or plastic, all of which are sufficiently light as to be suitable for spacecraft applications.

A trough (not shown for reasons of clarity), such as trough 42 of FIG. 2 containing the fluid, could be positioned over corrugated platform 60 and feed the fluid through individual dispensers 27 (FIG. 1), which are positioned over each furrow 61. It should be understood that the width of furrows 61 is grossly exaggerated in FIG. 3 for the sake of clarity. The actual width of each furrow 61 in a practical application would be approximately 1–5 mm.

Droplets 28 are removed from the opposite end of corrugated platform 60 by fluid retrievers 67 which extend through ports 66 and discharge into retrieval trough 68. This embodiment allows movement of a spacecraft during operation of the fluid pump.

It will be appreciated by those skilled in the art that fluid 26 can flow in either direction along a fluid conveyance means, referred to in the above embodiments as filaments 20 and corrugated platform 60. An asymmetric periodic wave or oscillation with primarily positive excursions will tend to drive fluid 26 away from force generator 10, while primarily negative excursions will tend to drive fluid 26 toward force generator 10.

As fluid may be directed either toward or away from force generator 10, a fluid loop can be established. This can be done with force generators 10 located at opposite ends of the fluid conveyance means, or, alternatively, both generators 10 can be located at the same end.

In a simple but effective form, force generator 10 can be an acoustic speaker or other electromagnetically driven oscillator driven by a wave generator capable of producing an asymmetric wave. In this case, filament 20 (FIG. 1), or common drivers 40 (FIG. 2) and 50 (FIG. 3) is attached to the central area of the speaker cone, and fluid droplets traverse filament 20 according to the positive and negative excursions of the asymmetric wave.

The foregoing description of embodiments of the present invention has been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vibratory fluid pump comprising:
    force generating means for outputting asymmetric waves or oscillations;
    elongate fluid conveyance means having a first end attached to said force generating means for conveying a fluid along its length;
    fluid introduction means in fluid communication with said first end of said elongate wave transmission means for placing a fluid onto said elongate fluid conveyance means;
    elastic means attached to a second end of said elongate fluid conveyance means and to a termination for elastically securing said elongate fluid conveyance means;

fluid recovery means in fluid communication with said second end of said elongate fluid conveyance means for extracting said fluid from said second end of said elongate fluid conveyance means.

2. The fluid pump as described in claim 1, wherein said force generation means comprises a wave generator connected to an electromechanically driven oscillator.

3. The fluid pump as described in claim 1, wherein said elastic means comprises one or more springs.

4. The fluid pump as described in claim 1, wherein said elongate fluid conveyance means comprises one or more filaments.

5. The fluid pump as described in claim 4, wherein said one or more filaments are comprised of a material pervious to a fluid.

6. The fluid pump as described in claim 4, wherein said one or more filaments is comprised of a material impervious to a fluid.

7. The fluid pump as described in claim 4, wherein said one or more filaments is comprised of single strand stainless steel.

8. The fluid pump as described in claim 1, wherein said elongate fluid conveyance means comprises a corrugated platform having a plurality of furrows.

9. The fluid pump as described in claim 8, wherein said corrugated platform is comprised of titanium.

10. The fluid pump as described in claim 8, wherein said corrugated platform is comprised of aluminum.

11. The fluid pump as described in claim 8, wherein said corrugated platform is comprised of a plastic.

12. The fluid pump as described in claim 8, wherein said furrows have a width of 1 to 5 mm.

13. A method of exposing a fluid to a surrounding atmosphere comprising the steps of:
generating an asymmetric wave or oscillation in an elongate fluid conveyance means for conveying a fluid between its first and second ends;
introducing a fluid onto said first end of said elongate fluid conveyance means;
removing said fluid from said second end of said elongate fluid conveyance means.

14. The method as described in claim 13, wherein said asymmetric wave is generated by a wave generator connected to an electromechanically driven oscillator.

15. The method as described in claim 13, wherein said elongate fluid conveyance means comprises one or more filaments.

16. The method as described in claim 15, wherein said one or more filaments is comprised of a material pervious to a fluid.

17. The method as described in claim 15, wherein said one or more filaments is comprised of a material impervious to a fluid.

18. The method as described in claim 13, wherein said elongate fluid conveyance means comprises a corrugated platform having a plurality of furrows of width from 1 to 5 mm.

* * * * *